(12) United States Patent
Kawakami et al.

(10) Patent No.: US 9,666,326 B2
(45) Date of Patent: May 30, 2017

(54) LITHIUM MANGANESE OXIDE COMPOSITE, SECONDARY BATTERY, AND MANUFACTURING METHOD THEREOF

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Shuhei Yoshitomi, Kanagawa (JP); Teruaki Ochiai, Kanagawa (JP); Satoshi Seo, Kanagawa (JP); Yohei Momma, Kanagawa (JP); Yumiko Saito, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/272,718

(22) Filed: May 8, 2014

(65) Prior Publication Data
US 2014/0332715 A1    Nov. 13, 2014

(30) Foreign Application Priority Data

May 10, 2013 (JP) .................................. 2013-100358
May 10, 2013 (JP) .................................. 2013-100383

(51) Int. Cl.
*H01B 1/08* (2006.01)
*H01M 4/36* (2006.01)
(Continued)

(52) U.S. Cl.
CPC ........... *H01B 1/08* (2013.01); *C01G 45/1242* (2013.01); *C01G 45/1257* (2013.01);
(Continued)

(58) Field of Classification Search
CPC .. H01B 1/14; H01B 1/20; H01B 1/08; H01M 4/505; H01M 4/364; H01M 4/366;
(Continued)

(56) References Cited

U.S. PATENT DOCUMENTS 4,302,518 A    11/1981    Goodenough et al.
4,668,595 A    5/1987    Yoshino et al.
(Continued)

FOREIGN PATENT DOCUMENTS

CN    101080830 A    11/2007
CN    101148263 A    3/2008
(Continued)

OTHER PUBLICATIONS

Johnson et al. ("Lithium-manganese oxide electrodes with layered-spinel composite structures xLi2MnO3•(1-x)LiMn2O4" Electrochemistry Communications 7 (2005) 528-536).*
(Continued)

*Primary Examiner* — Mark Kopec
*Assistant Examiner* — Matthew R Diaz
(74) *Attorney, Agent, or Firm* — Nixon Peabody, LLP; Jeffrey L. Costellia

(57) ABSTRACT

To increase the amount of lithium ions that can be received and released in and from a positive electrode active material to achieve high capacity and high energy density of a secondary battery. A composite material of crystallites of $LiMn_2O_4$ (crystallites with a spinel crystal structure) and crystallites of $Li_2MnO_3$ (crystallites with a layered rock-salt crystal structure) is used as a positive electrode active material. The lithium manganese oxide composite has high structural stability and high capacity.

10 Claims, 13 Drawing Sheets

(51) Int. Cl.
*H01M 4/131* (2010.01)
*H01M 4/505* (2010.01)
*C01G 45/12* (2006.01)

(52) U.S. Cl.
CPC ........... *H01M 4/131* (2013.01); *H01M 4/364* (2013.01); *H01M 4/366* (2013.01); *H01M 4/505* (2013.01); *C01P 2002/72* (2013.01); *C01P 2002/76* (2013.01); *C01P 2004/80* (2013.01); *C01P 2006/40* (2013.01); *Y02P 70/54* (2015.11)

(58) Field of Classification Search
CPC ...... H01M 4/131; H01M 4/362; C01D 15/02; C01G 45/1242; C01G 45/1257; C01G 45/1252; C01G 45/125
See application file for complete search history.

(56) References Cited

U.S. PATENT DOCUMENTS

| | | | |
|---|---|---|---|
| 5,240,794 A | 8/1993 | Thackeray et al. | |
| 5,443,929 A | 8/1995 | Yamamoto et al. | |
| 5,783,333 A | 7/1998 | Mayer | |
| 5,834,139 A | 11/1998 | Shodai et al. | |
| 5,871,866 A | 2/1999 | Barker et al. | |
| 5,910,382 A | 6/1999 | Goodenough et al. | |
| 6,085,015 A | 7/2000 | Armand et al. | |
| 6,514,640 B1 | 2/2003 | Armand et al. | |
| 7,303,840 B2 | 12/2007 | Thackeray et al. | |
| 7,393,476 B2 | 7/2008 | Shiozaki et al. | |
| 7,635,536 B2 | 12/2009 | Johnson et al. | |
| 7,736,807 B2 * | 6/2010 | Hasegawa | H01M 4/382 429/199 |
| 7,790,308 B2 | 9/2010 | Johnson et al. | |
| 8,080,340 B2 | 12/2011 | Thackeray et al. | |
| 8,557,440 B2 | 10/2013 | Yu et al. | |
| 2001/0010807 A1 | 8/2001 | Matsubara | |
| 2002/0195591 A1 | 12/2002 | Ravet et al. | |
| 2004/0234857 A1 | 11/2004 | Shiozaki et al. | |
| 2006/0051671 A1 | 3/2006 | Thackeray et al. | |
| 2006/0051673 A1 | 3/2006 | Johnson et al. | |
| 2006/0121352 A1 | 6/2006 | Kejha et al. | |
| 2007/0026315 A1 | 2/2007 | Lampe-Onnerud et al. | |
| 2007/0160906 A1 | 7/2007 | Tooyama et al. | |
| 2007/0212609 A1 | 9/2007 | Iwami | |
| 2009/0087731 A1 | 4/2009 | Fukui et al. | |
| 2009/0123813 A1 | 5/2009 | Chiang et al. | |
| 2009/0123842 A1 | 5/2009 | Thackeray et al. | |
| 2009/0220862 A1 | 9/2009 | Toyama et al. | |
| 2010/0143784 A1 | 6/2010 | Johnson et al. | |
| 2010/0233542 A1 | 9/2010 | Endo et al. | |
| 2010/0248033 A1 * | 9/2010 | Kumar | B82Y 30/00 429/223 |
| 2011/0200879 A1 * | 8/2011 | Saito | H01M 4/131 429/221 |
| 2011/0229757 A1 | 9/2011 | Kawakami et al. | |

FOREIGN PATENT DOCUMENTS

| | | |
|---|---|---|
| DE | 4142370 | 6/1992 |
| JP | 06-342658 A | 12/1994 |
| JP | 08-037007 A | 2/1996 |
| JP | 11-025983 | 1/1999 |
| JP | 2008-511960 | 4/2008 |
| JP | 2008-166156 A | 7/2008 |
| JP | 2012-084257 A | 4/2012 |
| KR | 2007-0083550 A | 8/2007 |
| WO | WO-2006/028476 | 3/2006 |

OTHER PUBLICATIONS

M. Thackeray et al., "$Li_2MnO_3$-stabilized $LiMO_2$ (M = Mn, Ni, Co) electrodes for lithium-ion batteries", *J. Mater. Chem.*, 2007, vol. 17, Issue 30, pp. 3112-3125.

Berbenni.V et al., "Thermogravimetry and X-Ray Diffraction Study of the Thermal Decomposition Processes in $Li_2CO_3$-$MnCO_3$ Mixtures", Journal of Analytical and Applied Pyrolysis, 2002, vol. 62, pp. 45-62.

International Search Report (Application No. PCT/JP2014/062542) Dated Aug. 12, 2014.

Written Opinion (Application No. PCT/JP2014/062542) Dated Aug. 12, 2014.

Chinese Office Action (Application No. 201480025454.2) Dated Sep. 14, 2016.

* cited by examiner in case of Charge

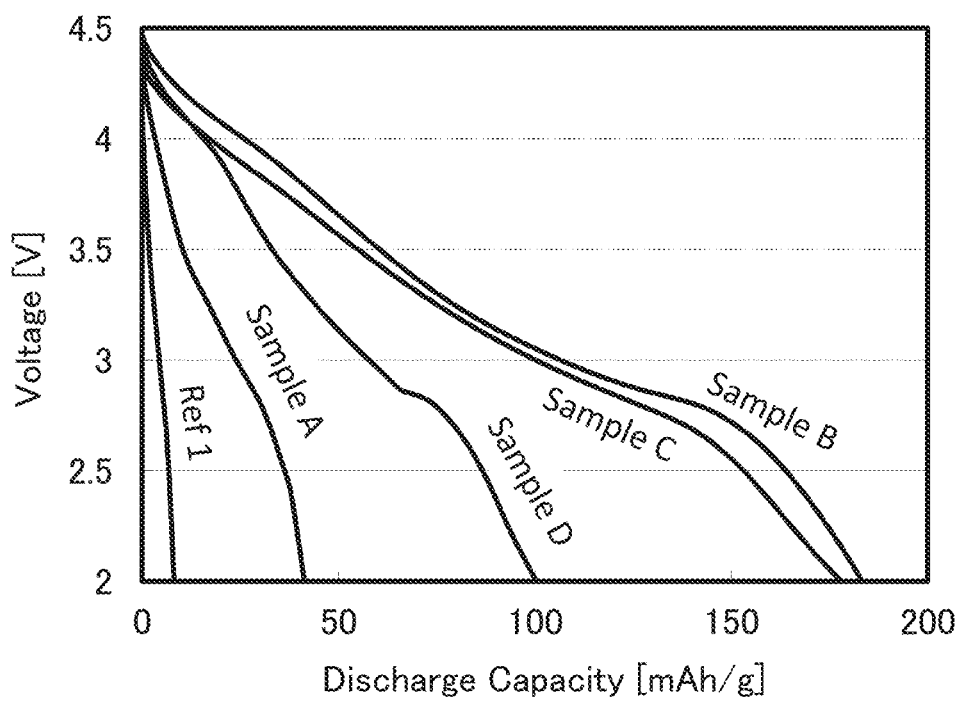

LITHIUM MANGANESE OXIDE COMPOSITE, SECONDARY BATTERY, AND MANUFACTURING METHOD THEREOF

TECHNICAL FIELD

The present invention relates to the structure and a manufacturing method of a secondary battery. In particular, the present invention relates to a positive electrode active material of a lithium-ion secondary battery.

BACKGROUND ART

Examples of the secondary battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively developed because capacity thereof can be increased and size thereof can be reduced.

In a lithium-ion secondary battery, as a positive electrode active material, a phosphate compound having an olivine structure and containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), which are disclosed in Patent Document 1, has been known.

REFERENCE

[Patent Document 1] Japanese Published Patent Application No. H11-25983

DISCLOSURE OF INVENTION $LiCoO_2$ is used as a positive electrode active material of a lithium-ion secondary battery. However, cobalt, a raw material of $LiCoO_2$, is expensive. In view of this problem, an object is to provide a positive electrode active material that can be formed at low cost with the use of manganese, which is an inexpensive material.

Another object is to increase the amount of lithium ions that can be received and released in and from a positive electrode active material to achieve high capacity and high energy density of a secondary battery.

Further, high ion conductivity and high electric conductivity are required as properties of a positive electrode active material of a lithium-ion secondary battery. Thus, another object is to provide a positive electrode active material having high ion conductivity and high electric conductivity.

The inventors have found that a novel material can be formed by combining lithium manganese oxides, $LiMn_2O_4$ with a spinel crystal structure and $Li_2MnO_3$ with a layered rock-salt ($\alpha$-$NaFeO_2$ type) crystal structure.

The novel material is a lithium manganese oxide composite having a spinel crystal structure in part of the surface of each particle with a layered rock-salt crystal structure. In the case of using this novel material as a positive electrode active material of a lithium-ion secondary battery, lithium inside the particle is released or diffused through the region with a spinel crystal structure of the surface of the particle, resulting in high capacity. Furthermore, the novel material includes a plurality of portions each with a spinel crystal structure such that the each particle is dotted with them. Note that in each particle of the novel structure, a region with a layered rock-salt crystal structure is larger than the regions each with a spinel crystal structure.

Each particle contains a plurality of crystallites and the size of each crystallite is smaller than that of the particle, specifically, less than or equal to 1 μm. Note that whether the particle contains a plurality of crystallites can be determined with a high resolution transmission electron microscope (TEM). Furthermore, a crystal structure can be determined with the use of a fast Fourier transformation pattern (FFT pattern) using a high resolution TEM image (multiple wave interference image). By comparison with data (e.g., an incident angle or a diffraction intensity) on $Li_2MnO_3$ with a layered rock-salt crystal structure or data (e.g., an incident angle or a diffraction intensity) on $LiMn_2O_4$ with a spinel structure, which is contained in a JCPDS card (database on index minerals for powder X-ray diffraction patterns), a crystal structure can be determined. Thus, when some portions in the same particle of the novel material are determined, at least a spot corresponding to a spinel crystal structure and a spot corresponding to a layered rock-salt crystal structure are observed. Note that a crystallite means the largest aggregation that can be regarded as a single crystal and refers to a fine single crystal. The size of one crystallite can be calculated (by Scherrer formula) from peak broadening of a diffraction pattern obtained using a powder X-ray diffraction method.

The novel material can also be referred to as a composite material of crystallites of $LiMn_2O_4$ (crystallites with a spinel crystal structure) and crystallites of $Li_2MnO_3$ (crystallites with a layered rock-salt crystal structure). FIG. 1 is a model diagram illustrating one particle of this novel material.

In FIG. 1, one particle includes at least two kinds of crystallites of a crystallite 101 with a spinel crystal structure and a crystallite 102 with a layered rock-salt crystal structure. As in FIG. 1, the novel material is a lithium manganese oxide composite where each particle has a spinel crystal structure and a layered rock-salt crystal structure in contact with the spinel crystal structure. When a lithium battery using this material as a positive electrode active material is charged or discharged, lithium of $Li_2MnO_3$ in each particle is released or received through the crystallites 101 with a spinel crystal structure which are scattered on the surface of the particle.

FIG. 11A illustrates comparative example 1, and FIG. 11B illustrates comparative example 2. The novel material is greatly different from comparative examples 1 and 2 in structure and property. FIG. 11A illustrates a mixture of a plurality of particles, that is, a mixture of particles each having a spinel crystal structure and a size of several micrometers (Spi-$LiMn_2O_4$ particles 104) and $Li_2MnO_3$ particles 103 each having a layered rock-salt crystal structure and a size of several micrometers. FIG. 11B illustrates a material 105 obtained by sintering the mixture in FIG. 11A at high temperature (e.g., 1000° C.). In obtaining the $Li_2MnO_3$ particles 103 from comparative example 1 or 2, $Li_2CO_3$ (lithium carbonate) and $MnCO_3$ (manganese carbonate) are weighed so that the ratio of $Li_2CO_3$ to $MnCO_3$ is 1:1, and they are pulverized in a ball mill or the like and fired. In obtaining the Spi-$LiMn_2O_4$ particles 104, $Li_2CO_3$ and $M_nCO_3$ are weighed so that the ratio of $Li_2CO_3$ to $MnCO_3$ is 0.5:2, and they are pulverized in a ball mill or the like and fired.

There are at least two methods for forming the novel material. As for one of the methods, in the case where the ratio for weighing (also referred to as the ratio of materials) is made to be different from that of the comparative example so that the crystallites 101 with a spinel crystal structure are included at approximately 2%, $Li_2CO_3$ and $MnCO_3$ are weighed so that the ratio of $Li_2CO_3$ to $MnCO_3$ is 0.98:1.01, and they are pulverized in a ball mill or the like and fired at higher than or equal to 800° C. and lower than or equal to 1100° C. Note that "the crystallites 101 with a spinel crystal structure are included at approximately 2%" means that the crystallites 102 with a layered rock-salt crystal structure are included at approximately 98%". In the case where each particle includes the crystallites 101 with a spinel crystal structure at approximately 5% (the crystallites with a layered locked crystal structure at approximately 95%), $Li_2CO_3$ and $MnCO_3$ are weighed so that the ratio of $Li_2CO_3$ to $MnCO_3$ is 0.955:1.03, and they are pulverized in a ball mill or the like and fired. In the case where the crystallites 101 with a spinel crystal structure are included at approximately 50%, $Li_2CO_3$ and $MnCO_3$ are weighed so that the ratio of $Li_2CO_3$ to $MnCO_3$ is 0.64:1.28, and they are pulverized in a ball mill or the like and fired. The novel material is formed by intentionally changing the ratio of materials so that the crystallites 101 with a spinel crystal structure are included at greater than or equal to approximately 2% and less than or equal to 50%.

In another method for forming the novel material, $Li_2CO_3$ (lithium carbonate) and $MnCO_3$ (manganese carbonate) are weighed so that the ratio of $Li_2CO_3$ to $MnCO_3$ is 1:1, and they are pulverized in a ball mill or the like and fired at higher than 380° C. and lower than 950° C., preferably at approximately 500° C. When the firing is performed at lower than 380° C., only $Spi\text{-}LiMn_2O_4$ particles are formed, whereas when firing is performed at higher than or equal to 950° C., only $Li_2MnO_3$ particles with a layered rock-salt crystal structure are formed. Thus, firing at 500° C. enables formation of a lithium manganese oxide composite where crystallites with a spinel structure and crystallites with a layered rock-salt crystal structure exist in each particle.

When a lithium manganese oxide where crystallites with a spinel structure and crystallites with a layered rock-salt crystal structure exist in each particle is formed, a battery including the oxide is fabricated, and the oxide is chemically analyzed to examine the element composition, the composition might be different from that calculated from the ratio of materials by less than 10%. The present invention can be implemented without departing from the technical idea and should not be construed as being out of the scope of the present invention only because the composition of a formed substance does not exactly correspond to the ratio of materials.

The inventors have found that a novel lithium manganese oxide composite can be formed by mixing $Li_2CO_3$ particles and $MnCO_3$ particles so that the ratio (molar mixing ratio) of $Li_2CO_3$ to $MnCO_3$ is in the range from 0.88:1.09 ($=Li_2CO_3:MnCO_3$) to 0.98:1.01 ($=Li_2CO_3:MnCO_3$), preferably from 0.91:1.06 ($=Li_2CO_3:MnCO_3$) to 0.95:1.03 ($=Li_2CO_3:MnCO_3$) and performing heat treatment at higher than or equal to 500° C. and lower than or equal to 1000° C.

The raw materials of the novel material are not limited to only two kinds of material; NiO among other materials, in addition to $Li_2CO_3$ and $MnCO_3$, may be weighed and added, and they may be pulverized in a ball mill or the like and fired. The novel material can be obtained under either the air or a nitrogen atmosphere in the firing process.

The use of the novel material, the lithium manganese oxide composite, as a positive electrode active material of a lithium secondary battery increases the capacity and energy density of the secondary battery.

The positive electrode active material can be used for a secondary battery that is used in a portable information terminal, a home-use constant power source device, an electric motor cycle, an electric vehicle, hybrid electric vehicle, or the like.

The lithium manganese oxide composite disclosed in this specification has high structural stability and high capacity. Furthermore, the lithium manganese oxide composite disclosed in this specification can be formed through a simple forming process where a plurality of materials are weighed, pulverized in a ball mill or the like, and mixed, and then the mixture is fired; thus, an effect of reducing cost can be obtained and excellent mass productivity is achieved.

Firing at a high temperature of 800° C. or higher in a synthesis process of the lithium manganese oxide composite disclosed in this specification allows the oxide to have high crystallinity and excellent cycle characteristics.

BRIEF DESCRIPTION OF DRAWINGS

In the accompanying drawings:

FIG. 12 is a graph showing the relation between discharge capacity and voltage of one embodiment of the present invention.

BEST MODE FOR CARRYING OUT THE INVENTION

Embodiments and an example of the present invention will be described below in detail with reference to the drawings. However, the present invention is not limited to the following descriptions, and it is easily understood by those skilled in the art that modes and details disclosed herein can be modified in various ways. Furthermore, the present invention is not construed as being limited to descriptions of the embodiments and the example.

Embodiment 1

A method for forming a novel material will be described below in detail.

First, starting materials lithium carbonate ($Li_2CO_3$), manganese carbonate ($MnCO_3$), and nickel oxide (NiO) are weighed.

In this embodiment, the ratio of raw materials is adjusted according to the idea of changing the ratio. The ratio is changed to form a lithium manganese oxide composite having a spinel crystal structure in part of the surface of each particle with a layered rock-salt crystal structure.

In the case where $Li_2CO_3$, $MnCO_3$, and NiO are used at a ratio of 1:0.7:0.3 (=$Li_2CO_3$:$MnCO_3$:NiO), $Li_2Mn_{0.7}Ni_{0.3}O_3$ is obtained. Thus, it is important to change this ratio.

In this embodiment, $Li_2CO_3$, $MnCO_3$, and NiO are weighed such that the ratio thereof is 0.84:0.8062:0.318 (=$Li_2CO_3$:$MnCO_3$:NiO). Note that the ratio is represented as a molar ratio. Acetone is added to the powder of these materials, and then, they are mixed in a ball mill to prepare mixed powder.

After that, heating is performed to volatilize acetone, so that a mixed material is obtained.

Then, the mixed material is put into a melting pot, and is fired at a temperature in the range from 800° C. to 1100° C. in the air for 5 to 20 hours inclusive to synthesize a novel material.

Subsequently, grinding is performed to separate the sintered particles. For the grinding, acetone is added and then mixing is performed in a ball mill.

After the grinding, heating is performed to volatilize acetone, and then, vacuum drying is performed, so that a powdery novel material is obtained.

Figure 1:
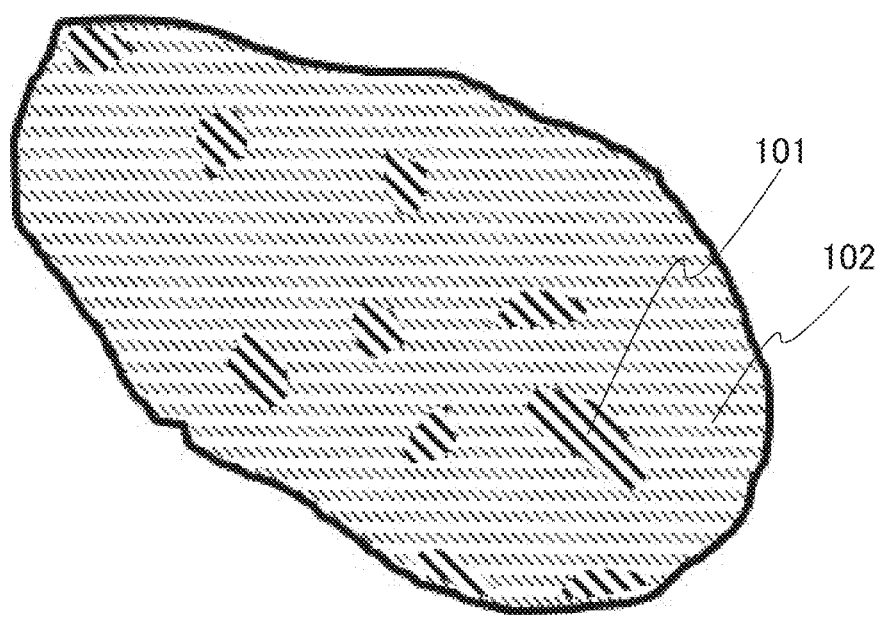
FIG. 1 is a model diagram illustrating one embodiment of the present invention.
Figure 2:
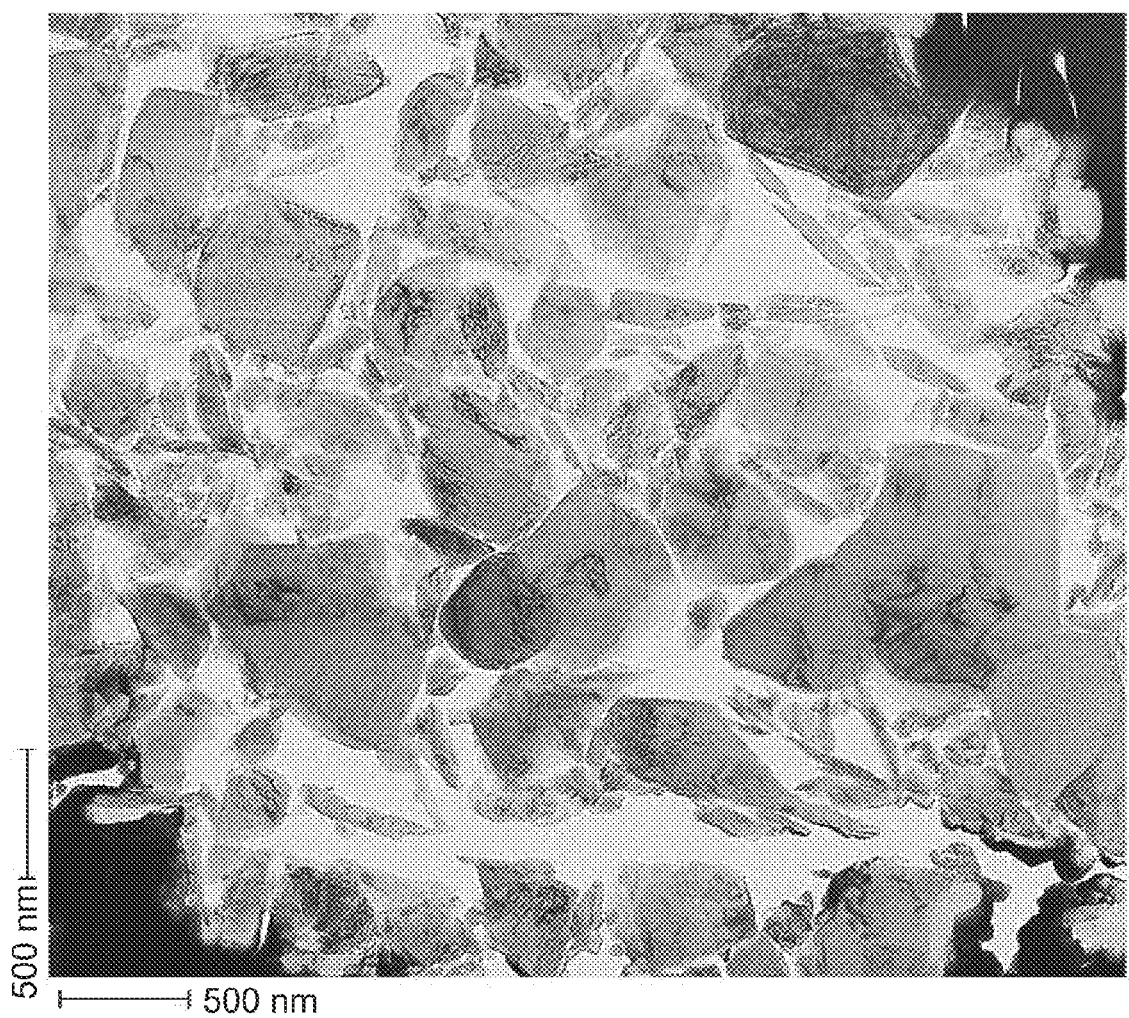
FIG. 2 is a cross-sectional TEM image of one embodiment of the present invention.

FIG. 2 shows a cross-sectional TEM image of the thus obtained novel material.

Figure 3:
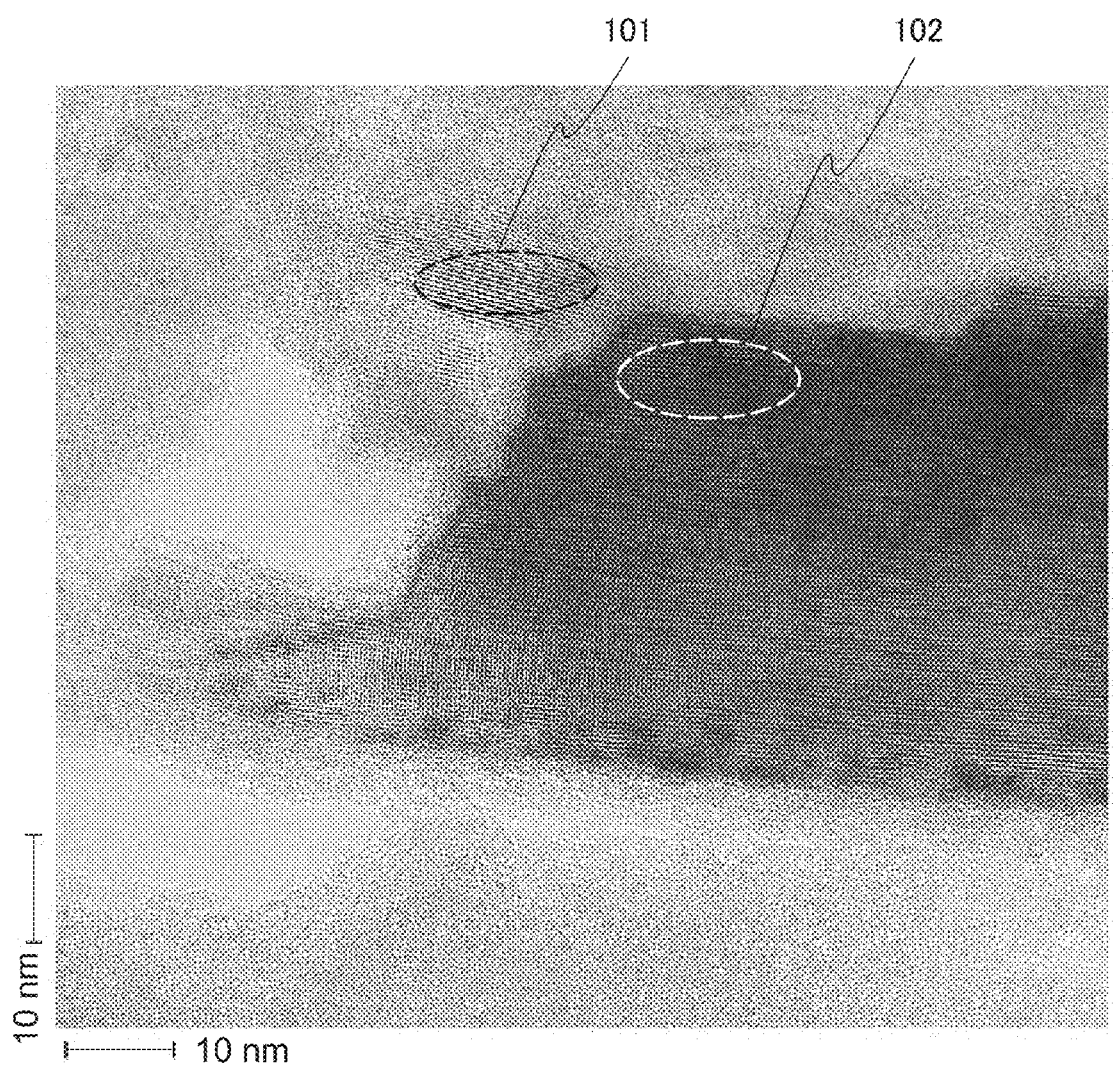
FIG. 3 is an enlarged partial image of FIG. 2.

FIG. 3 is an enlarged image of one of a plurality of particles in FIG. 2. As shown in FIG. 3, a region surrounded by a black dotted line corresponds to a crystallite 101 having a spinel crystal structure, and a region surrounded by a white dotted line corresponds to a crystallite 102 having a layered rock-salt crystal structure.

When an FFT pattern is obtained by the FFT analysis from a part of the region surrounded by the black dotted line in FIG. 3, the values determined by the positional relation (e.g., a distance and an angle) of the obtained spots correspond to the data of JCPDS card No. 35-0782 (e.g., an incident angle and a diffraction intensity) on $LiMn_2O_4$ with a spinel crystal structure which belongs to the space group Fd3m (number 227). Thus, the region can be identified as a spinel crystal structure.

When an FFT pattern is obtained by the FFT analysis from a part of the region surrounded by the white dotted line in FIG. 3, the lattice constant can be determined by the positional relation (a distance and an angle) of the obtained spots. Thus, the crystal structure of the region can be identified as a layered rock-salt crystal structure by $Li_2MnO_3$ JCPDS card No. 81-1953 (a space group C2/c, number 15).

The use of this novel material as a positive electrode active material enables fabrication of a positive electrode.

Figure 4:
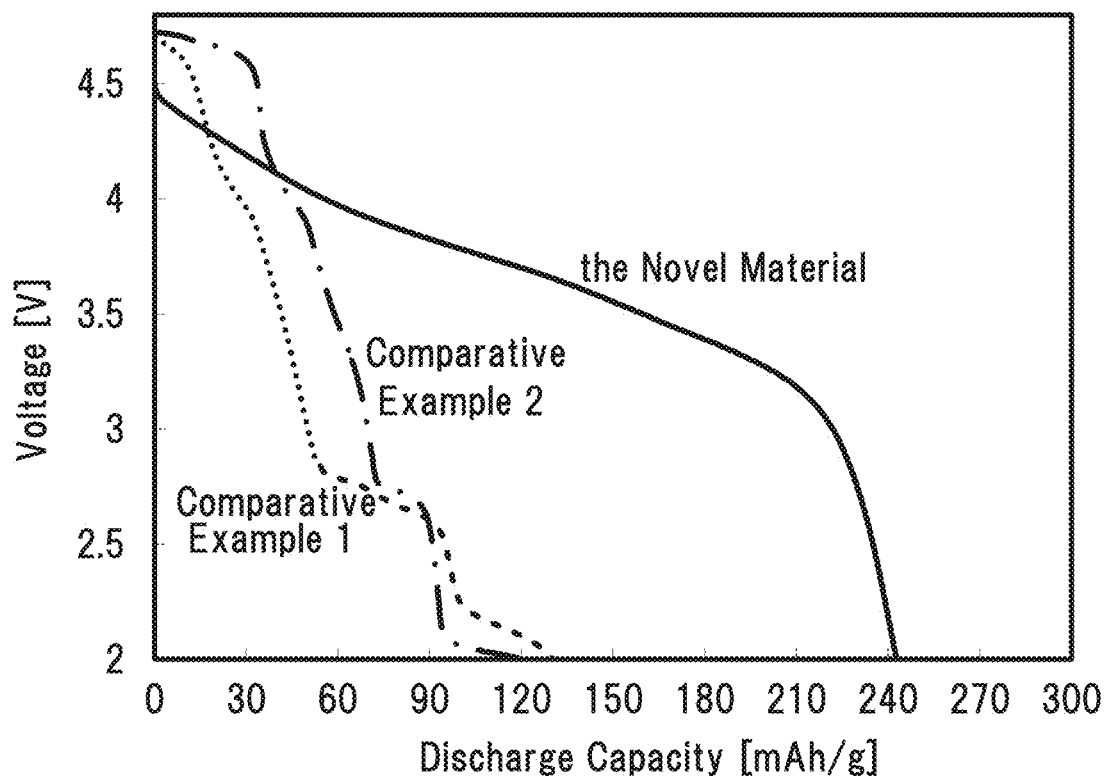
FIG. 4 is a graph showing the relation between discharge capacity and voltage of one embodiment of the present invention and comparative examples.

FIG. 4 shows measured discharge capacity of this novel material. The vertical axis represents voltage (V), and the horizontal axis represents discharge capacity (mAh/g).

In addition, comparative examples 1 and 2 will be described.

Figure 11A:
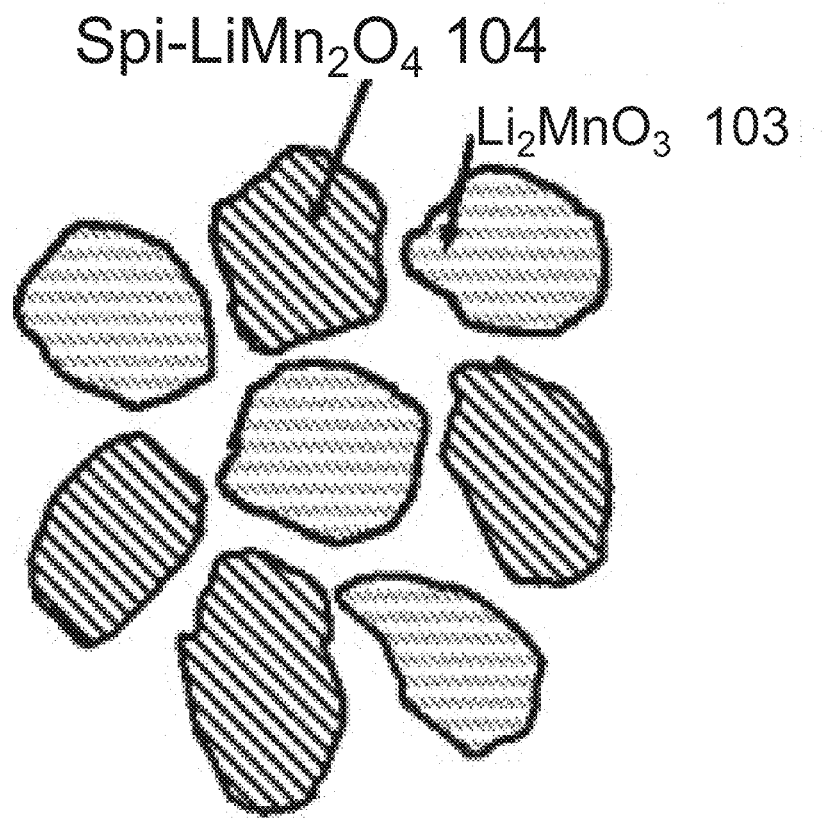
FIGS. 11A and 11B are model diagrams each illustrating a comparative example.

Comparative example 1, which corresponds to FIG. 11A, is sample 1 formed in such a manner that particles each having a size of several micrometers and a spinel crystal structure (Spi-$LiMn_2O_4$ particles 104) and the $Li_2MnO_3$ particles 103 each having a size of several micrometers and a layered rock-salt crystal structure are separately synthesized and the Spi-$LiMn_2O_4$ particles 104 and the $Li_2MnO_3$ particles 103 are mixed.

Figure 11B:
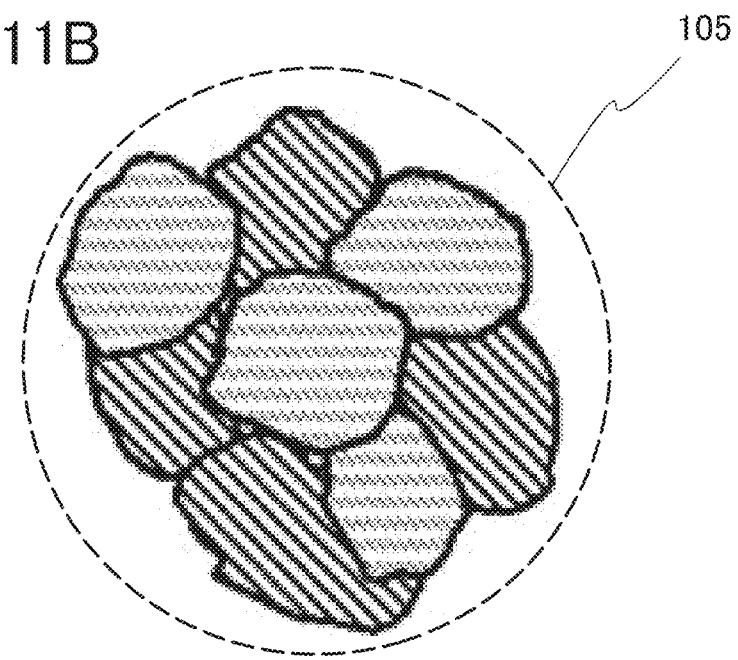

Comparative example 2, which corresponds to FIG. 11B, is sample 2 obtained by firing sample 1 at 1000° C.

As shown in FIG. 4, the discharge capacity of the novel material is higher than those of comparative examples 1 and 2. Thus, the novel material, that is, a lithium manganese oxide composite having a spinel crystal structure in part of the surface of each particle with a layered rock-salt crystal structure has a high capacity although synthesized at a high temperature.

In this embodiment, $Li_2CO_3$, $MnCO_3$, and NiO are used as starting materials; however, materials are not particularly limited thereto and any other material may be used as long as a lithium manganese oxide composite having a spinel crystal structure in part of the surface of each particle with a layered rock-salt crystal structure can be formed.

Embodiment 2

In this embodiment, a novel material is obtained by a forming method different from that in Embodiment 1.

First, starting materials lithium carbonate ($Li_2CO_3$) and manganese carbonate ($MnCO_3$) are weighed.

In this embodiment, firing temperature is adjusted to synthesize a novel material.

In this embodiment, $Li_2CO_3$ and $MnCO_3$ are weighed such that the ratio thereof is 1:1 (=$Li_2CO_3$:$MnCO_3$). Acetone is added to the powder of these materials, and then, they are mixed in a ball mill to prepare mixed powder. After that, heating is performed to volatilize acetone, so that a mixed material is obtained.

Then, the mixed material is put into a melting pot, and is fired at a temperature higher than 380° C. and lower than 950° C., preferably at approximately 500° C., in the air for 5 to 20 hours inclusive.

Subsequently, grinding is performed to separate the sintered particles. For the grinding, acetone is added and then mixing is performed in a ball mill.

After the grinding, heating is performed to volatilize acetone, and then, vacuum drying is performed, so that a powdery novel material is obtained.

When an FFT pattern is obtained by the FFT analysis using a cross-sectional TEM image of the thus obtained novel material from a region of the particle of the novel material, the region can be identified as the one with a spinel crystal structure by $LiMn_2O_4$ JCPDS card No. 35-0782 (a space group Fd3m, number 227). When an FFT pattern is obtained by the FFT analysis from another region of the same particle, the region can be identified as the one with a layered rock-salt crystal structure by $Li_2MnO_3$ JCPDS card No. 81-1953 (a space group C2/c, number 15). Thus, the regions in the same particle can be identified as the ones with two kinds of crystal structures as in Embodiment 1.

These results show that the novel material substantially the same as that in Embodiment 1 can be formed. Note that since the firing temperature in Embodiment 1 is high, the crystallinity of the novel material in Embodiment 1 is higher than that of the novel material obtained in this embodiment.

The use of the novel material of this embodiment as a positive electrode active material enables fabrication of a positive electrode.

Figure 5:
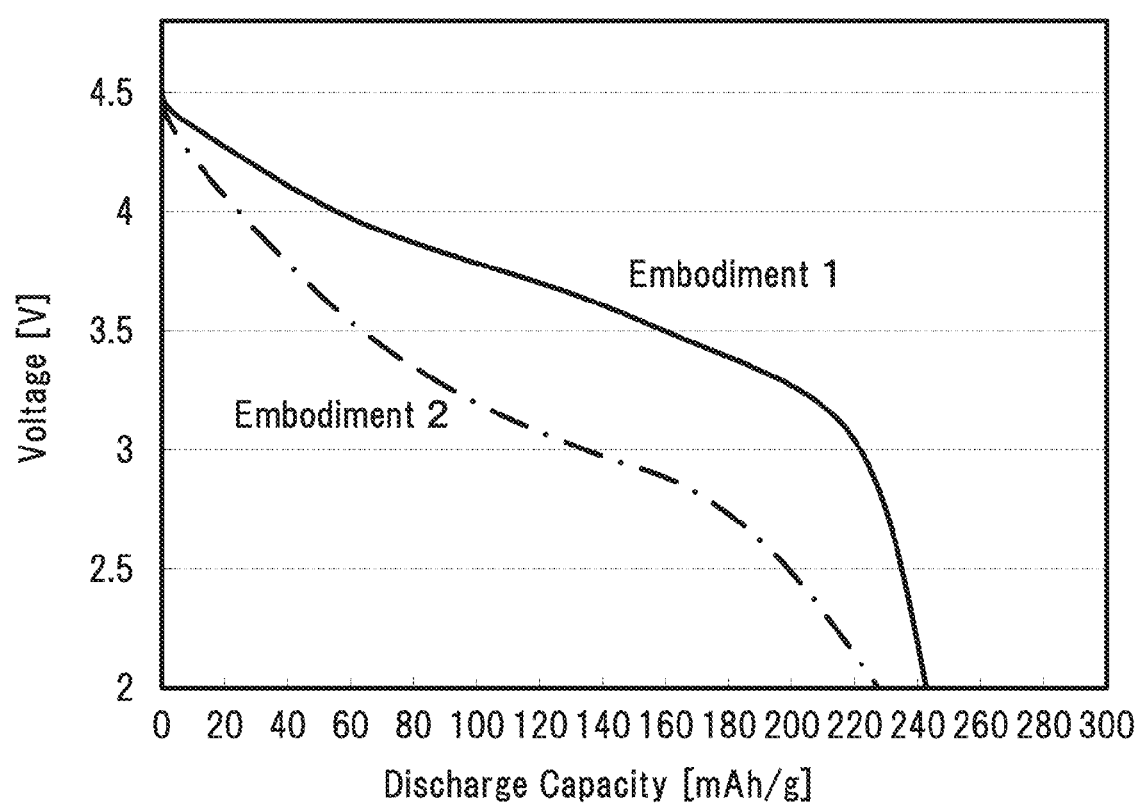
FIG. 5 is a graph showing the relation between discharge capacity and voltage of one embodiment of the present invention.

FIG. 5 shows measured discharge capacity of the novel material of this embodiment. FIG. 5 also shows the discharge capacity of the novel material of Embodiment 1.

A comparative material is formed at a firing temperature lower than or equal to 380° C., and an FFT pattern is obtained by the FFT analysis using a cross-sectional TEM image of the material. As a result, only the region identified as the one with a spinel crystal structure by $LiMn_2O_4$ JCPDS card No. 35-0782 (a space group Fd3m, number 227) can be observed. The discharge capacity of this comparative material is measured to be as low as 110 mAh/g.

When a comparative material is formed at a firing temperature higher than or equal to 950° C., and an FFT pattern is obtained by the FFT analysis using a cross-sectional TEM image of the material, only the region identified as a spinel crystal structure by $Li_2MnO_3$ JCPDS card No. 81-1953 (a space group C2/c, number 15) can be observed. The discharge capacity of this comparative material is measured to be a low value of 18 mAh/g.

The above results suggest that whether a particle has two kinds of crystal structures depends on the firing temperature.

Embodiment 3

A method for forming a novel material will be described below in detail.

First, starting materials $Li_2CO_3$ and $MnCO_3$ are weighed.

In this embodiment, the ratio of materials is adjusted according to the idea of changing the ratio of materials. The ratio of materials is changed to form a lithium manganese oxide composite having a spinel crystal structure in part of the surface of each particle with a layered rock-salt crystal structure.

Table 1 shows the target percentage of part with a spinel crystal structure in each of materials formed in this embodiment (samples A to D and comparative examples 1 to 5), the target percentage of part with a layered rock-salt crystal structure in each of the materials, and the ratios of materials. Note that forming methods of samples A to D and comparative examples 1 to 5 are substantially the same except for the ratio of materials.

TABLE 1

| | Percentage (%) | | |
|---|---|---|---|
| | $Li_2MnO_3$ | spi-$LiMn_2O_4$ | Feed ratio of materials |
| comperative example 1 | 100 | 0 | $Li_2CO_3$:$MnCO_3$ = 1:1 |
| sample A | 98 | 2 | $Li_2CO_3$:$MnCO_3$ = 0.98:1.01 |
| sample B | 95 | 5 | $Li_2CO_3$:$MnCO_3$ = 0.955:1.03 |
| sample C | 90 | 10 | $Li_2CO_3$:$MnCO_3$ = 0.91:1.06 |
| sample D | 85 | 15 | $Li_2CO_3$:$MnCO_3$ = 0.88:1.09 |
| comperative example 2 | 80 | 20 | $Li_2CO_3$:$MnCO_3$ = 0.84:1.12 |
| comperative example 3 | 60 | 40 | $Li_2CO_3$:$MnCO_3$ = 0.71:1.23 |
| comperative example 4 | 50 | 50 | $Li_2CO_3$:$MnCO_3$ = 0.64:1.28 |
| comperative example 5 | 0 | 100 | $Li_2CO_3$:$MnCO_3$ = 0.5:2 |

According to Table 1, the materials are weighed.

Acetone is added to the powder of these materials, and then, they are mixed in a ball mill to prepare mixed powder. In this embodiment, the weighed materials, a zirconia ball with a diameter of 3 mm, and acetone are put into a pot made of zirconia, and wet ball milling using a planetary ball mill is performed at 400 rpm for 2 hours.

After that, heating is performed to volatilize acetone, so that a mixed material is obtained. In this embodiment, acetone in slurry subjected to the ball milling is volatilized at 50° C. in the air to obtain the mixed material.

Then, the mixed material is put into a melting pot, and is fired at a temperature in the range from 500° C. to 1000° C. in the air for 5 to 20 hours inclusive to synthesize a novel material. In this embodiment, a melting pot made of aluminum is filled with the mixed material that has been dried, and heating is performed at 900° C. for 10 hours.

Subsequently, grinding is performed to separate the sintered particles. In this embodiment, the fired material, a zirconia ball with a diameter of 3 mm, and acetone are put into a pot made of zirconia, and wet ball milling using a planetary ball mill is performed at 200 rpm for 2 hours.

After the grinding, heating is performed to volatilize acetone, and then, vacuum drying is performed, so that powdery novel materials are obtained. In this embodiment, heating is performed on the mixture subjected to wet ball milling at 50° C. in the air to voltalize acetone, and then, vacuum drying is performed at 170° C.

The use of these novel materials (samples A to D) as positive electrode active materials enables fabrication of positive electrodes.

FIG. 12 shows measured discharge capacity of these novel materials (samples A to D) and comparative example 1.

As shown in FIG. 12, sample A, in which part with a spinel crystal structure occupies approximately 2% of the whole, has higher discharge capacity than comparative example 1, which is the material containing only $LiMn_2O_4$ with a spinel crystal structure. Sample D, in which part with a spinel crystal structure occupies approximately 15% of the whole, has higher discharge capacity than sample A. Sample C, in which part with a spinel crystal structure occupies approximately 10% of the whole, has higher discharge capacity than sample D. Among all the samples, sample B, in which part with a spinel crystal structure occupies approximately 5% of the whole, has the highest discharge capacity.

Figure 13:
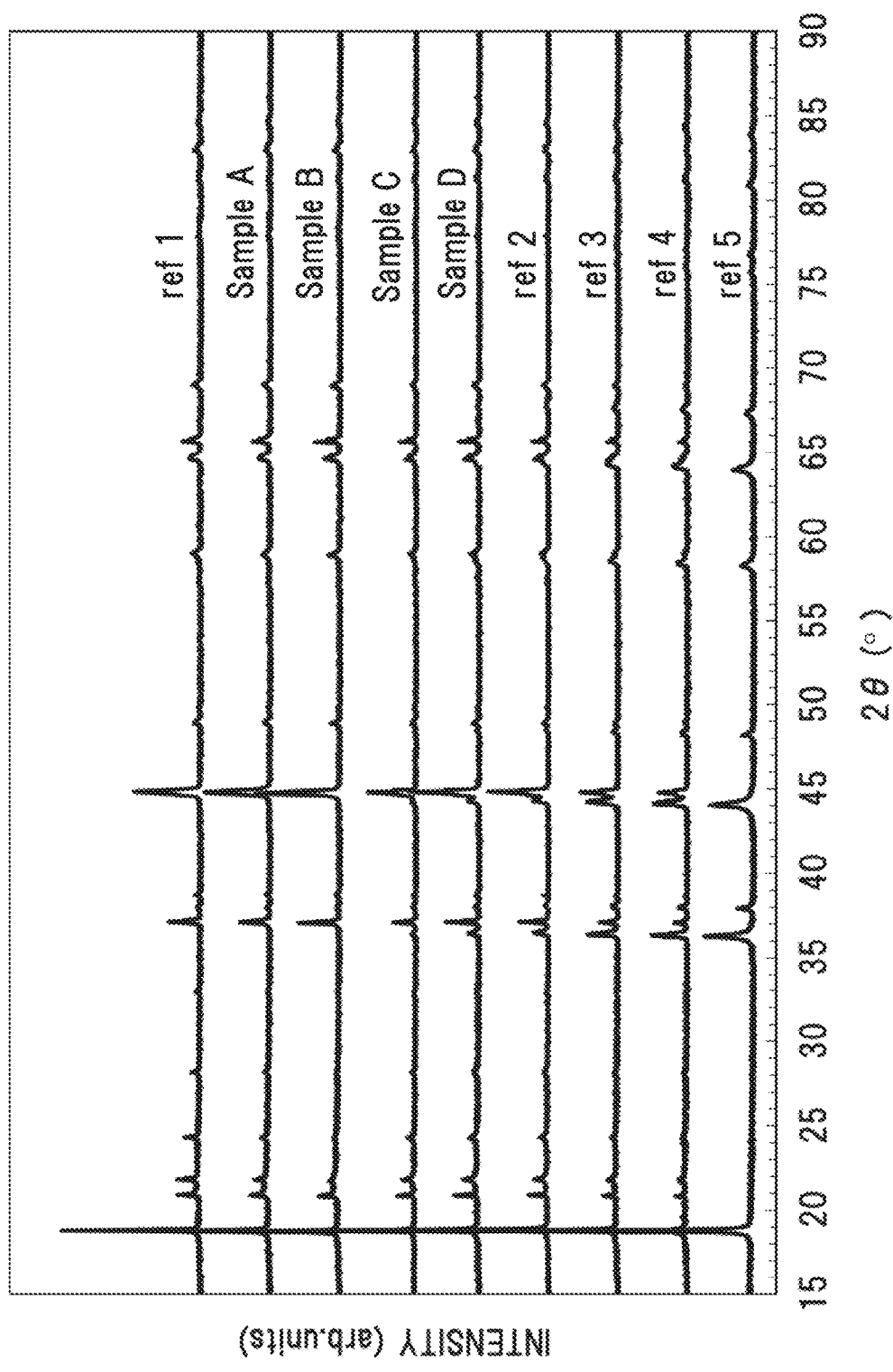
FIG. 13 is X-ray diffraction data of one embodiment of the present invention.

FIG. 13 shows X-ray diffraction (XRD) patterns of samples A to D and comparative examples 1 to 5 that are obtained by measurement. Although FIG. 13 shows all the data in one graph for comparison, the way to show the data is not particularly limited.

The XRD patterns of samples A to D each have diffraction peaks (at around 2θ of approximately 36° and approximately 44°) peculiar to a particle with a spinel crystal structure (Spi-$LiMn_2O_4$) and diffraction peaks (at around 2θ of approximately 21° and approximately 22°) peculiar to a particle with a layered rock-salt crystal structure ($Li_2MnO_3$). Similarly, the XRD patterns of comparative examples 2 to 4 each have diffraction peaks peculiar to a particle with a spinel crystal structure (Spi-$LiMn_2O_4$) and diffraction peaks peculiar to a particle with a layered rock-salt crystal structure ($Li_2MnO_3$).

The XRD pattern of comparative example 1 has diffraction peaks peculiar to a particle with a layered rock-salt crystal structure ($Li_2MnO_3$). The XRD pattern of comparative example 5 has diffraction peaks peculiar to a particle with a spinel crystal structure (Spi-$LiMn_2O_4$).

Embodiment 4

In this embodiment, the structure of a storage battery including the positive electrode active material formed by the forming method described in Embodiment 1, 2, or 3 will be described with reference to FIGS. 6A to 6C, FIG. 7, and FIGS. 8A and 8B.

Coin-Type Storage Battery

Figure 6A:
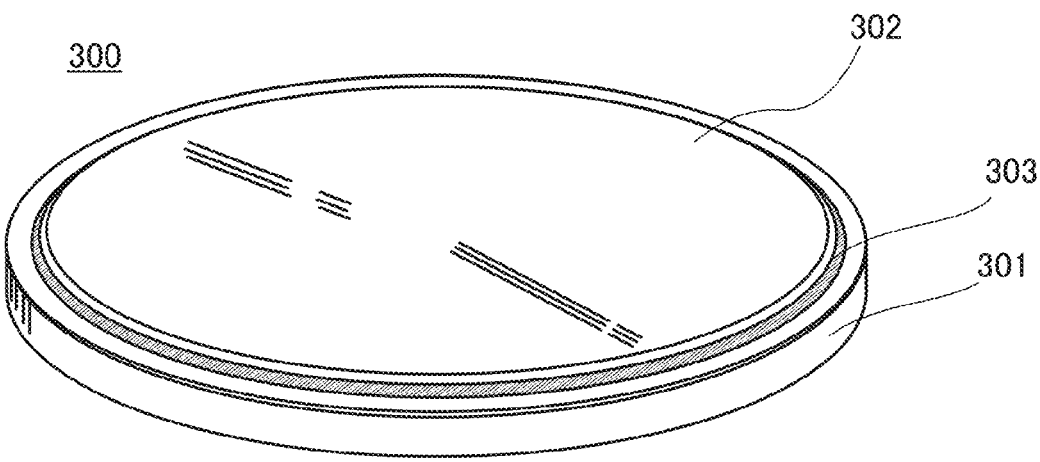
FIGS. 6A to 6C illustrate a coin-type secondary battery.
Figure 6B:
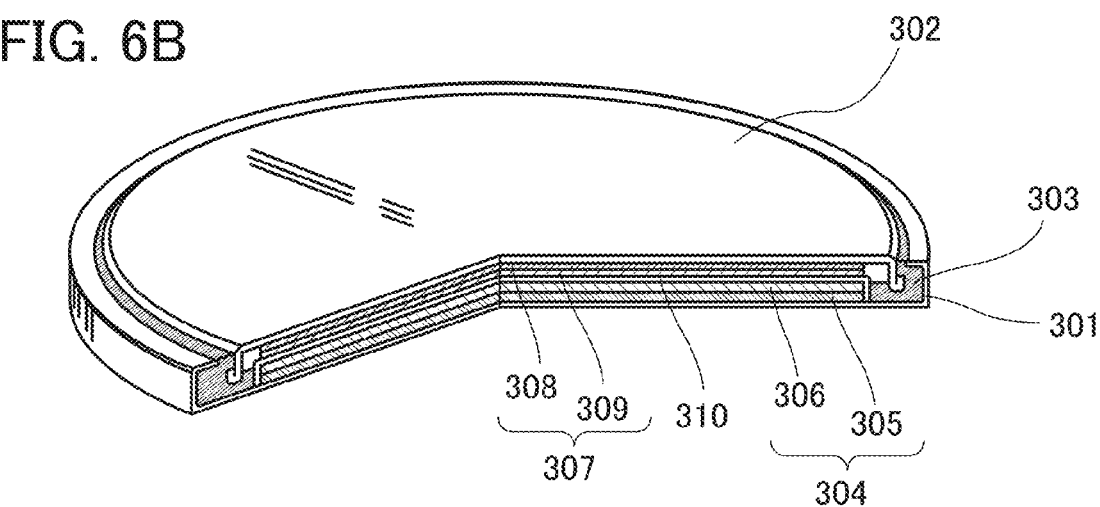

FIG. 6A is an external view of a coin-type (single-layer flat type) storage battery, and FIG. 6B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

A material with which lithium can be dissolved and precipitated or a material into and from which lithium ions can be inserted and extracted can be used for the negative electrode active materials used for the negative electrode active material layer 309; for example, a lithium metal, a carbon-based material, and an alloy-based material can be used. The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active materials, an alloy-based material which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used for example. Such elements have higher capacity than carbon. In particular, silicon has a significantly high theoretical capacity of 4200 mAh/g. For this reason, silicon is preferably used for the negative electrode active materials. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), and molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The current collectors 305 and 308 can each be formed using a highly conductive material which is not alloyed with a carrier ion of lithium among other elements, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive.

Any of the positive electrode active materials described in Embodiments 1 to 3 can be used for the positive electrode active material layer 306.

As the separator 310, an insulator such as cellulose (paper), polyethylene with pores, and polypropylene with pores can be used.

As an electrolyte in the electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, alkaline-earth metal ions, beryllium ions, or magnesium ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material in which carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution in charging and discharging a secondary battery, such as nickel, aluminum, and titanium, an alloy of any of the metals, an alloy containing any of the metals and another metal (e.g., stainless steel), a stack of any of the metals, a stack including any of the metals and any of the alloys (e.g., a stack of stainless steel and aluminum), or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 6B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 6C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the terms "anode" or "cathode" is used, it should be mentioned that the anode or the cathode is which of the one at the time of charging or the one at the time of discharging and corresponds to which of a positive electrode or a negative electrode.

Figure 6C:
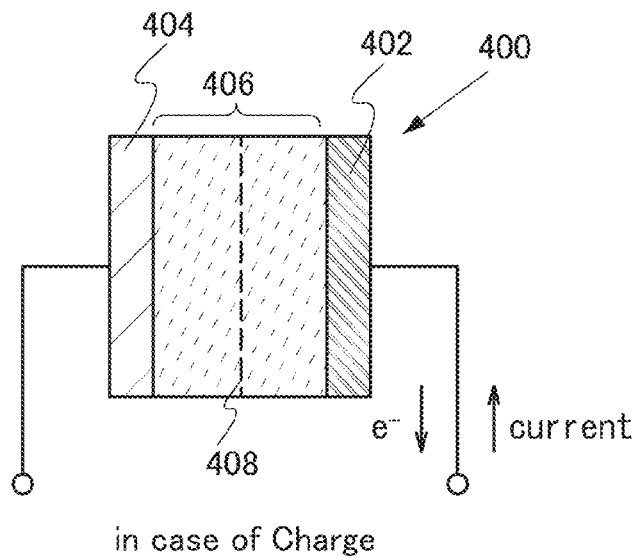

Two terminals in FIG. 6C are connected to a charger, and a storage battery 400 is charged. As the charge of the storage battery 400 proceeds, a potential difference between electrodes increases. The positive direction in FIG. 6C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

Next, an example of a laminated storage battery will be described with reference to FIG. 7.

Figure 7:
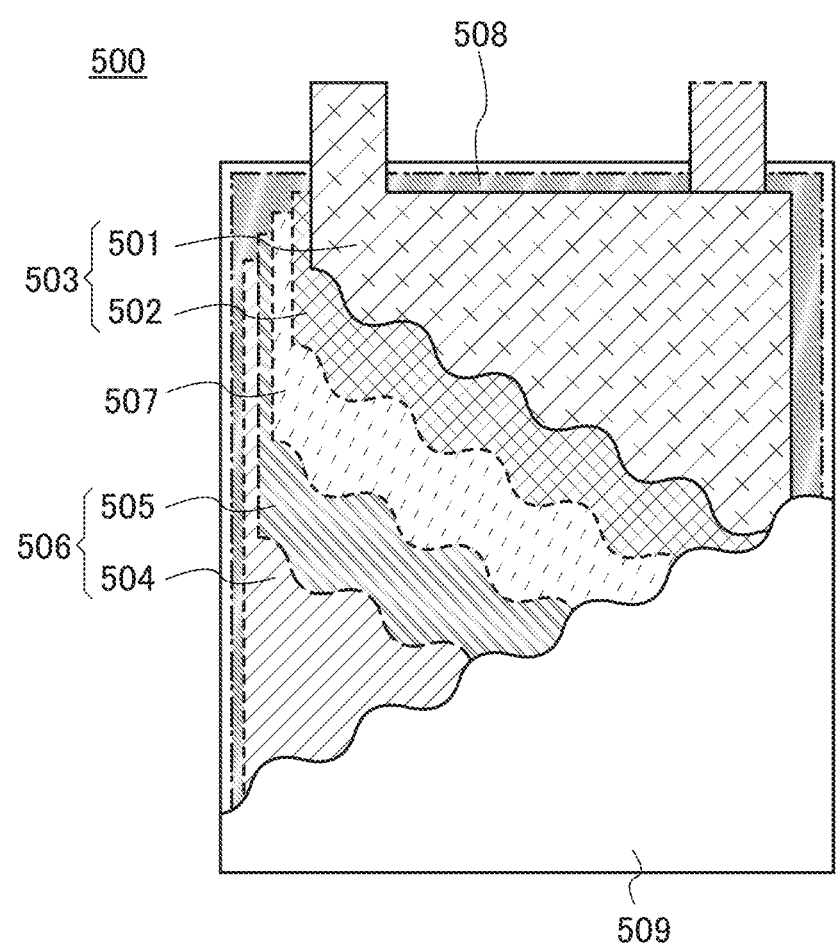
FIG. 7 illustrates a laminated secondary battery.

A laminated storage battery 500 illustrated in FIG. 7 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508.

In the laminated storage battery 500 illustrated in FIG. 7, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed on the outside the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolytic solution and a gas can be blocked and an insulating property can be obtained.

<Cylindrical Storage Battery>

Figure 8A:
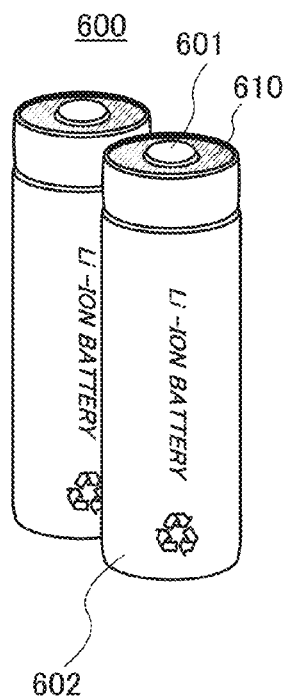
FIGS. 8A and 8B illustrate a cylindrical secondary battery.

Next, an example of a cylindrical storage battery will be described with reference to FIGS. 8A and 8B. As illustrated in FIG. 8A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 8B:
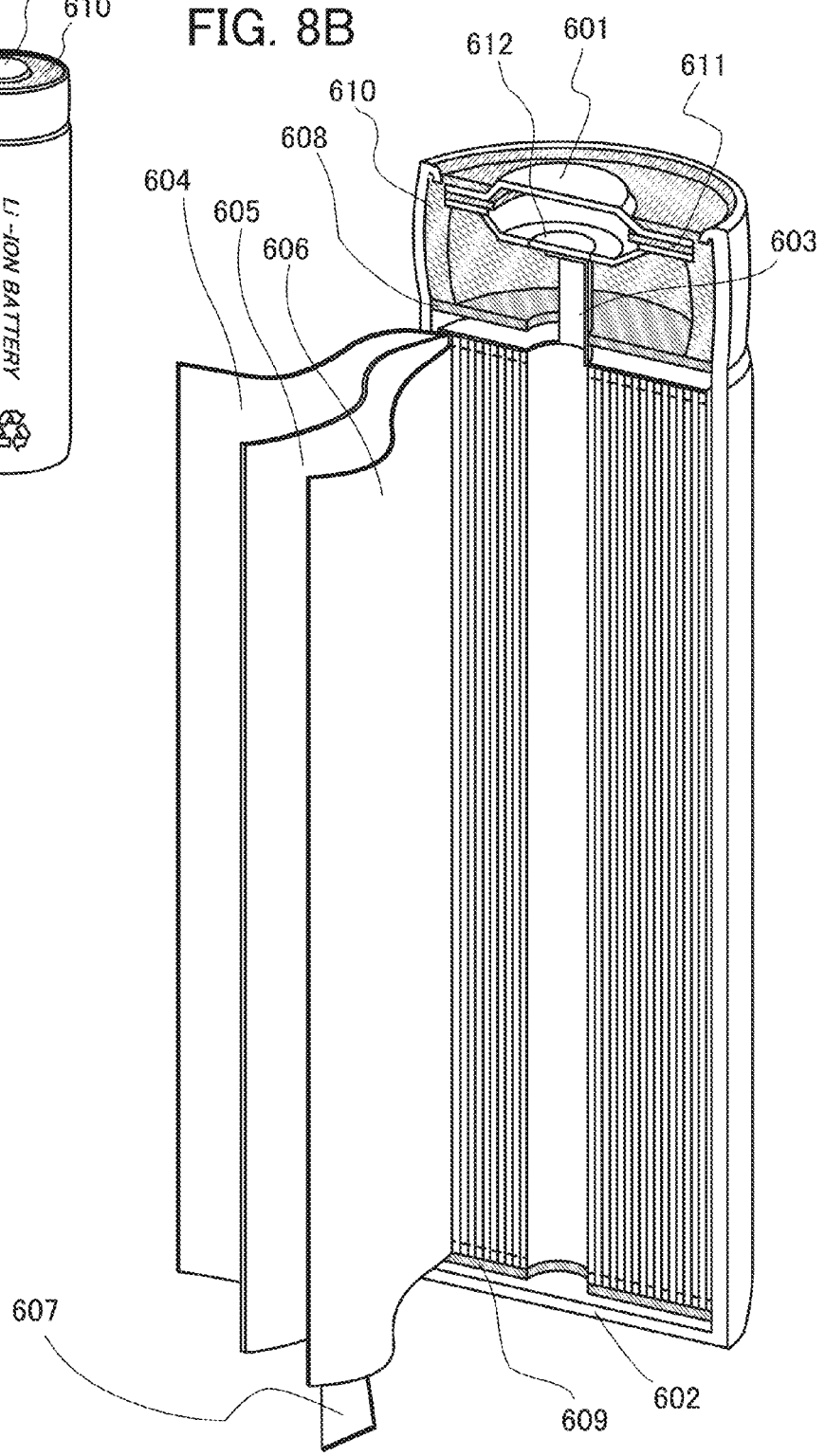

FIG. 8B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. For the battery can 602, a metal having corrosion resistance to an electrolytic solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion caused by a nonaqueous electrolytic solution. Inside the battery can 602, the battery element in which the positive electrode, the negative electrode, and the separator are wound is provided between a pair of insulating plates 608 and 609 which face each other. Inside the battery can 602, the battery element in which the positive electrode, the negative electrode, and the separator are wound is interposed between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution which is similar to those of the above coin-type storage battery and the laminated power storage device can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the positive electrodes of the storage batteries 300, 500, and 600, which are described in this embodiment, a positive electrode active material formed by the method for forming a positive electrode active material of one embodiment of the present invention is used. Thus, the discharge capacity of the storage batteries 300, 500, and 600 can be increased.

This embodiment can be implemented in combination with any of the other embodiments as appropriate.

Example 1

Figure 9:
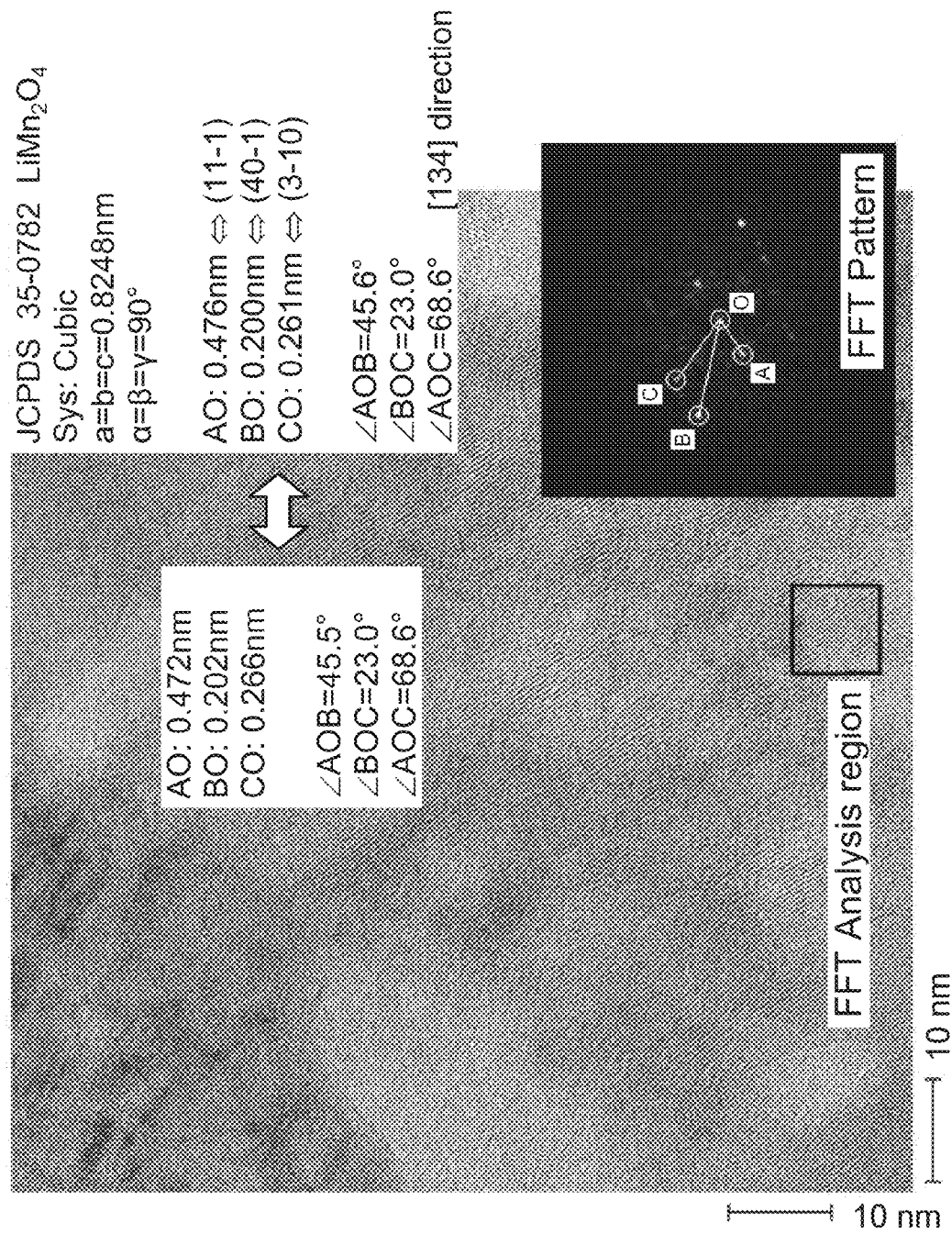
FIG. 9 shows a cross-sectional TEM image and an FFT analysis result of an example.
Figure 10:
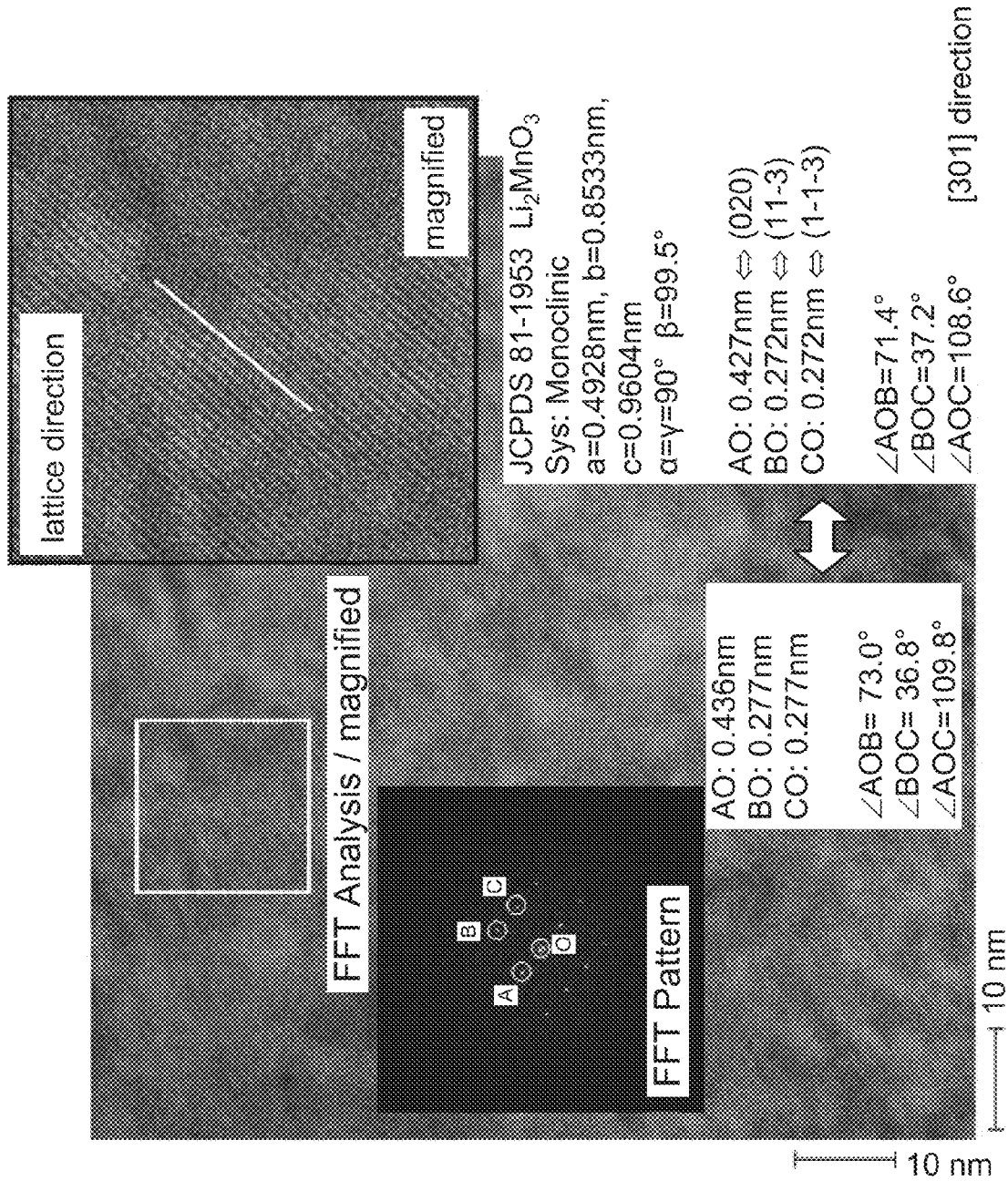
FIG. 10 shows a cross-sectional TEM image and an FFT analysis result of an example.

In this example, novel materials were synthesized according to Table 2, FFT patterns were obtained by the FFT analysis measurement in the range shown in a cross-sectional TEM image of one of the samples and part of the cross-sectional TEM image, and the crystal structures were determined. FIGS. 9 and 10 show the results.

TABLE 2

| | Percentage (%) | | Synthesis condition |
|---|---|---|---|
| | $Li_2MnO_3$ | spi-$LiMn_2O_4$ | Ratio of materials |
| 1 | 100 | 0 | $Li_2CO_3$:$MnCO_3$ = 1:1 |
| 2 | 98 | 2 | $Li_2CO_3$:$MnCO_3$ = 0.98:1.01 |
| 3 | 95 | 5 | $Li_2CO_3$:$MnCO_3$ = 0.955:1.03 |
| 4 | 90 | 10 | $Li_2CO_3$:$MnCO_3$ = 0.91:1.06 |
| 5 | 85 | 15 | $Li_2CO_3$:$MnCO_3$ = 0.88:1.09 |
| 6 | 80 | 20 | $Li_2CO_3$:$MnCO_3$ = 0.84:1.12 |
| 7 | 60 | 40 | $Li_2CO_3$:$MnCO_3$ = 0.71:1.23 |
| 8 | 50 | 50 | $Li_2CO_3$:$MnCO_3$ = 0.64:1.28 |
| ref. | 0 | 100 | $Li_2CO_3$:$MnCO_3$ = 0.5:2 |

Under condition 1 in Table 2, a novel material was formed according to Embodiment 2. Note that under the condition of a reference in Table 2, a novel material cannot be obtained.

A procedure for synthesis of the novel materials will be described below in detail.

Weighed materials, a zirconia ball with a diameter of 3 mm, and acetone were put into a pot made of zirconia, and wet ball milling using a planetary ball mill was performed at 400 rpm for 2 hours.

Then, the slurry subjected to acetone in slurry subjected to the ball milling was volatilized at 50° C. in the air, so that a mixed material is obtained.

Then, the mixed material was dried and a crucible made of aluminum was filled with the dried mixed material, and firing was performed at 800° C. to 1100° C. in the air for 10 hours to obtain an objective.

Subsequently, grinding was performed to separate the sintered particles. The fired material, a zirconia ball with a diameter of 3 mm, and acetone were put into a pot made of zirconia, and wet ball milling using a planetary ball mill was performed at 200 rpm for 2 hours.

After the grinding, heating is performed on the mixture subjected to wet ball milling at 50° C. in the air to voltalize acetone, and then, vacuum drying was performed at 170° C., so that a positive electrode active material that is a novel material was obtained.

A cross section of each sample was observed with a high-resolution transmission electron microscope (TEM) ("H9000-NAR" manufactured by Hitachi, Ltd.) at an acceleration voltage of 200 kV. FIG. 9 shows the cross-sectional TEM image of the novel material. An FFT analysis portion is shown by a black frame in FIG. 9. An FFT analysis result is shown in a lower right portion in FIG. 9. In addition, data on $LiMn_2O_4$ with a spinel crystal structure that is described in a JCPDS card is shown in an upper right portion in FIG. 9. The region surrounded by the black frame in FIG. 9 can be identified as a region with a spinel crystal structure.

FIG. 10 shows a cross-sectional TEM image of the novel material. An FFT analysis portion is shown by a white frame in FIG. 10. The obtained FFT analysis result is shown in a left portion in FIG. 10. In addition, data on $Li_2MnO_3$ with a layered rock-salt crystal structure that is described in a JCPDS card is shown in a lower right portion in FIG. 10. The region surrounded by the white frame in FIG. 10 can be identified as the one with a layered rock-salt crystal structure.

EXPLANATION OF REFERENCE

101: crystallite with spinel crystal structure, 102: crystallite with layered rock-salt crystal structure, 103: $Li_2MnO_3$ particle, 104: Spi-$LiMn_2O_4$ particle, 105: material obtained by sintering, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: storage battery, 402: positive electrode, 404: negative electrode, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism This application is based on Japanese Patent Application serial no. 2013-100358 filed with Japan Patent Office on May 10, 2013 and Japanese Patent Application serial no. 2013-100383 filed with Japan Patent Office on May 10, 2013, the entire contents of which are hereby incorporated by reference.

The invention claimed is:

1. A storage battery comprising:
a positive electrode comprising a particle comprising a crystal of $Li_2MnO_3$ and a plurality of crystals of $LiMn_2O_4$,
wherein at least one of the plurality of crystals of $LiMn_2O_4$ is exposed at a surface of the particle,
wherein a molar proportion of the crystal of $Li_2MnO_3$ in the particle is more than 85 mol % and less than 98 mol %,
wherein when the storage battery is charged in higher than 4.5 V, a discharge capacity of the particle of the storage battery until discharge voltage 2.0 V is greater than 220 mAh/g.

2. The storage battery according to claim 1, wherein the crystal of $Li_2MnO_3$ belongs to a space group C2/c.

3. The storage battery according to claim 1, wherein a molar proportion of the crystal of $LiMn_2O_4$ in the particle is more than 2 mol % and less than 15 mol %.

4. An electronic device comprising the storage battery according to claim 1.

5. A storage battery comprising:
a positive electrode comprising a particle comprising a crystal of $Li_2MnO_3$ and a plurality of crystals of $LiMn_2O_4$,
wherein a diameter of the particle is more than 500 nm,
wherein a diameter of at least one of the plurality of crystals of $LiMn_2O_4$ is more than 10 nm, and
wherein at least one of the crystal of $LiMn_2O_4$ is exposed at a surface of the particle,
wherein a molar proportion of the crystal of $Li_2MnO_3$ in the particle is more than 85 mol % and less than 98 mol %,
wherein when the storage battery is charged in higher than 4.5 V, a discharge capacity of the particle of the storage battery until discharge voltage 2.0 V is greater than 220 mAh/g.

6. The storage battery according to claim 5, wherein a molar proportion of the crystal of $LiMn_2O_4$ in the particle is more than 2 mol % and less than 50 mol %.

7. An electronic device comprising the storage battery according to claim 5.

8. A storage battery comprising:
a positive electrode comprising a particle consisting essentially of a crystal of $Li_2MnO_3$ and a plurality of crystals of $LiMn_2O_4$,
wherein a diameter of the particle is more than 500 nm,
wherein a diameter of at least one of the plurality of crystals of $LiMn_2O_4$ is more than 10 nm,
wherein at least one of the plurality of crystals of $LiMn_2O_4$ is exposed at a surface of the particle,
wherein a molar proportion of the crystal of $Li_2MnO_3$ in the particle is more than 85 mol % and less than 98 mol %,
wherein when the storage battery is charged in higher than 4.5 V, a discharge capacity of the particle of the storage battery until discharge voltage 2.0 V is greater than 220 mAh/g.

9. The storage battery according to claim 8, wherein a molar proportion of the plurality of crystals of $LiMn_2O_4$ in the particle is more than 2 mol % and less than 15 mol %.

10. An electronic device comprising the storage battery according to claim 8.